E. L. SHARPNECK & C. F. ATHERTON.
ELECTRIC CONTROLLING DEVICE FOR RAILWAY TRAINS.
APPLICATION FILED JAN. 30, 1913.

1,183,407.

Patented May 16, 1916.

Witnesses:
L. B. Weymouth
E. C. Murphy.

Inventors:
Eliel L. Sharpneck
Claude F. Atherton
By Henry J. Miller atty.

UNITED STATES PATENT OFFICE.

ELIEL L. SHARPNECK, OF WINTHROP, AND CLAUDE F. ATHERTON, OF BOSTON, MASSACHUSETTS.

ELECTRIC CONTROLLING DEVICE FOR RAILWAY-TRAINS.

1,183,407.  Specification of Letters Patent.  Patented May 16, 1916.

Application filed January 30, 1913. Serial No. 745,140.

*To all whom it may concern:*

Be it known that we, ELIEL L. SHARPNECK and CLAUDE F. ATHERTON, respectively of Winthrop and Boston, in the county of Suffolk and State of Massachusetts, have invented certain new and useful Improvements in Electric Controlling Devices for Railway-Trains, of which the following is a specification, reference being had to the accompanying drawings, forming part thereof.

This invention has reference to improvements in electric devices for controlling the movements of trains on a railway to effect the stopping of certain of said trains.

The object of the invention is to so construct electric devices for controlling the steam supply and the air brakes of trains that, under certain contingencies, certain of said trains may be stopped.

Another object of the invention is to provide a new and useful block system of electric circuits through which mechanism carried by a train may be actuated.

Other objects of the invention will appear from the following description.

The invention consists in the novel arrangement of the electric circuits and their terminals.

The invention also consists in such other novel features of construction and combination of parts as shall hereinafter be more fully described and pointed out in the claims.

Figure 1:
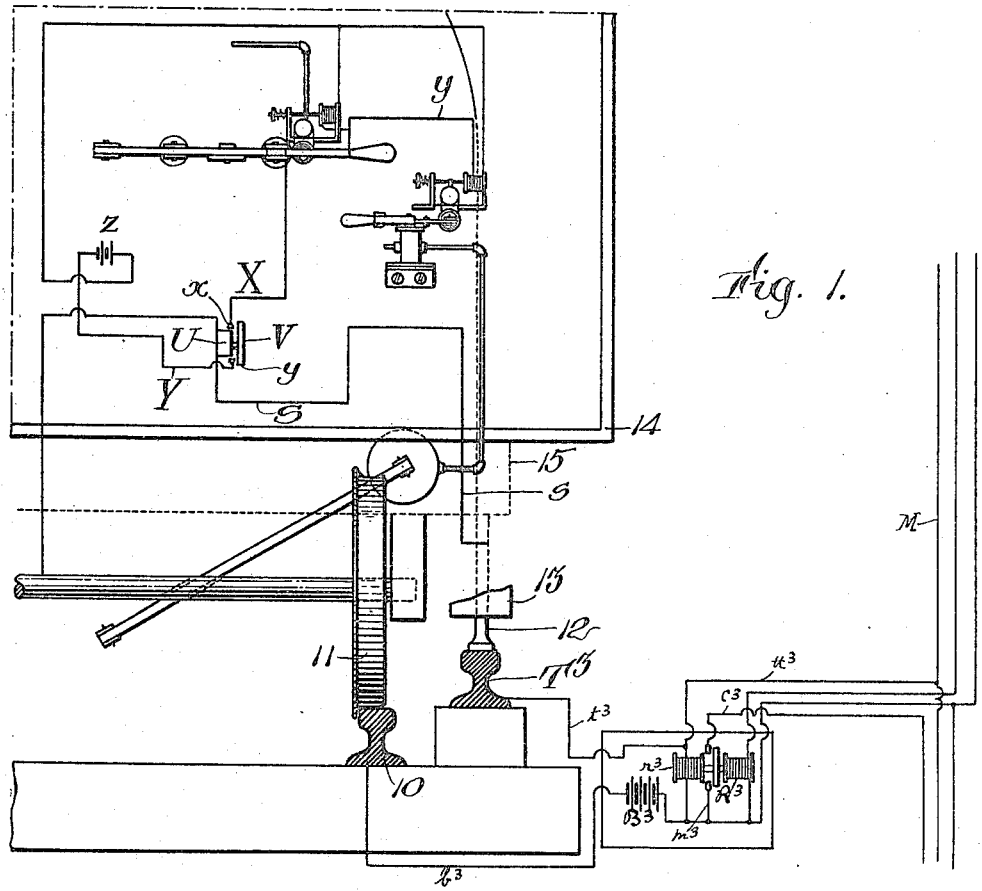
Figure 2:
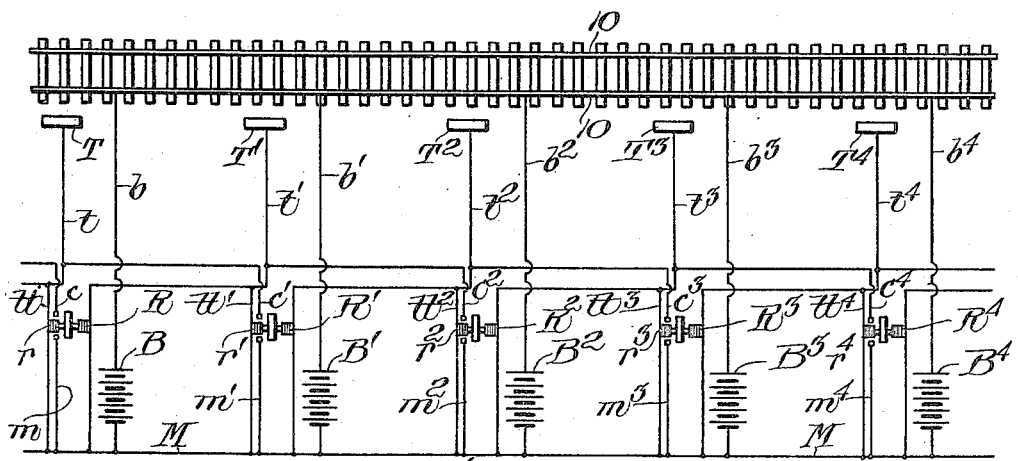

Figure 1, represents a diagrammatic view of the improved electric controlling system as applied to a railway and an engine operating on said railway. Fig. 2, represents a plan view of a railway and the block system of electric circuits more particularly relating to said railway.

Similar reference characters designate corresponding parts throughout.

As shown in the drawings in its preferred form 10, 10 indicate rails forming the grounded terminal of an electric circuit which ground terminal is connected at suitable intervals, representing block divisions of said rails, by branch electric conductors $b$, $b^1$, $b^2$, $b^3$, and $b^4$ through local batteries B, $B^1$, $B^2$, $B^3$ and $B^4$ with the main circuit M. Third rail terminals T, $T^1$, $T^2$, $T^3$ and $T^4$ are also located at suitable intervals along said railway and are connected by the electric conductors $t$, $t^1$, $t^2$, $t^3$, $t^4$ through the magnets of the relays R, $R^1$, $R^2$, $R^3$ and $R^4$ with said main M, while said terminal conductors $t$, $t^1$, $t^2$, $t^3$ and $t^4$ are connected through the magnets $r$, $r^1$, $r^2$, $r^3$, $r^4$ by the conductors $tt$, $tt^1$, $tt^2$, $tt^3$ and $tt^4$ with said main M. Extending from the main M are the conductors $m$, $m^1$, $m^2$, $m^3$ and $m^4$ and from the conductors $t$, $t^1$, $t^2$, $t^3$ and $t^4$ extend the conductors $c$, $c^1$, $c^2$, $c^3$ and $c^4$. These conductors $m$ to $m^4$ inclusive and $c$ to $c^4$ inclusive terminating at the open terminals of the relay magnets $r$ to $r^4$ inclusive.

When now the circuit is closed between one of the rails 10 and the third rail terminal $T^2$, for instance, the magnet of relay $r^2$ will be energized to effect the closing of the circuit between the terminals of conductors $m^2$ and $c^2$ whereby if electrical apparatus having comparatively a low resistance is introduced to close the circuit between said rail 10 and third rail terminal $T^1$ said apparatus will receive electric current from said circuit and, presumably, will be actuated and such closed condition of the main circuit will continue after the circuit has been opened between rail 10 and third rail terminal $T^2$. If, now, the circuit closer moves along said rails 10, 10 until it contacts with third rail terminal $T^3$ a similar operation of the closing of the circuit between the conductors $m^3$ and $c^3$ will be effected by the energizing of the magnet of relay $r^3$ and, simultaneously the electric circuit will be completed through the conductor to the magnet of relay $R^2$ whereby the armature of said relay will be actuated to open the circuit between conductors $c^2$ and $m^2$ whereby third rail terminal $T^1$ is cut out from electrical connection with battery $B^1$. It will then be seen that when the circuit is closed between the rails 10 and any one of the third rail terminals the third rail terminal next back of said closed terminal is connected with its related battery and is in condition to transmit electrical energy from its said battery to a suitable electrical mechanism introduced, as a circuit closing device between a rail 10 and such energized terminal. At the same time, however, the third rail terminal back of said energized terminal is always dead or unenergized.

Provision is made to effect the closing of the electric circuit between the rails 10, 10 and the third rail terminals in succession during the movement of a train along said rails 10, 10 and such means may be carried on any part of the train but, preferably, are carried on or appertain to the engine and comprise the wheels as 11, operating on said tracks 10, 10 and the electrical contact shoe 12 slidably mounted in the guide 13 which depends from some portion of the engine cab 14 or of its truck 15. The wheels 11, 11 and the contact shoe 12 of course being electrically connected as I shall now proceed to describe.

The contact shoe 12 is connected by the electric conductor S, through the magnet U with axle of wheels as 11 and thence to rails 10 whereby when shoe 12 is brought into electrical contact with one of the terminals T the coils of magnet U of less resistance than magnets $r$, $r^1$, $r^2$, $r^3$ and $r^4$ will be energized by electrical current from one of the related batteries B, to attract armature V of said magnet U to a position to close the normally open terminals $x$, $y$, of the electrical circuit X—Y which circuit includes the battery Z.

As has been stated above, if a train provided with this controlling mechanism travels along the rails 10, 10 the contact shoe 12 will contact with the several third rail terminals T, T, in succession and will complete the circuits as above described. Armature V will, however, not be closed on the terminals $x$, $y$, owing to the fact that the magnets $r$, $r$, are of greater electrical resistance than the magnet U, but the magnet of relay R next back of said connected third rail terminal will be energized to effect the closing of its armature against the terminals of its conductors $c$ and $m$ whereby the circuit is connected around the related magnet $r$. If, while said circuit is thus connected, another following train completes the circuit with the third rail terminal appertaining thereto the electric current will have a free course around the particular magnet $r$ and the magnet U of the train circuit will be energized to attract its armature V and thus close the circuit X—Y.

Having thus described our invention we claim as new and desire to secure by Letters Patent.

1. An electric controlling means of the nature described, comprising a railway, a continuous main conductor, batteries connected at intervals with said railway and with said continuous conductor, a series of contact terminals spaced along said railway, a normally open connection between each contact terminal and the continuous conductor, and electromagnetic means connected with each contact terminal for closing the normally open connection of the preceding contact terminal.

2. An electric controlling means of the nature described comprising a railway, a series of contact terminals spaced along said railway electric circuits arranged in blocks along said railway and electrically connected with said railway, each of said block circuits including a circuit closer of comparatively high resistance and a direct circuit having open terminals adapted to be closed thereby, and a circuit closer traveling on said railway and having an electric circuit including a relay magnet of comparatively low resistance, and a working electric circuit having open terminals adapted to be closed by the operation of said relay.

3. An electric controlling means of the nature described comprising a railway, a series of terminals spaced along said railway, a series of electric circuits arranged in blocks and connected respectively with said railway and said terminals, each of said circuits including circuit opening and circuit closing relays of comparatively high resistance, a circuit closer actuated thereby, and a direct circuit having normally open terminals adapted to be closed by said closer, a circuit closer traveling on said railway and having a circuit closing relay of comparatively low resistance, and a working electric circuit having normally open terminals adapted to be closed by the operation of said latter circuit closing relay.

ELIEL L. SHARPNECK.
CLAUDE F. ATHERTON.

Witnesses:
HENRY J. MILLER,
ESTHER C. MURPHY.

Copies of this patent may be obtained for five cents each, by addressing the "Commissioner of Patents, Washington, D. C."